No. 657,717. Patented Sept. 11, 1900.
J. C. WHARTON.
PROCESS OF MAKING PHOSPHATES.
(Application filed Dec. 18, 1899.)
(No Model.)
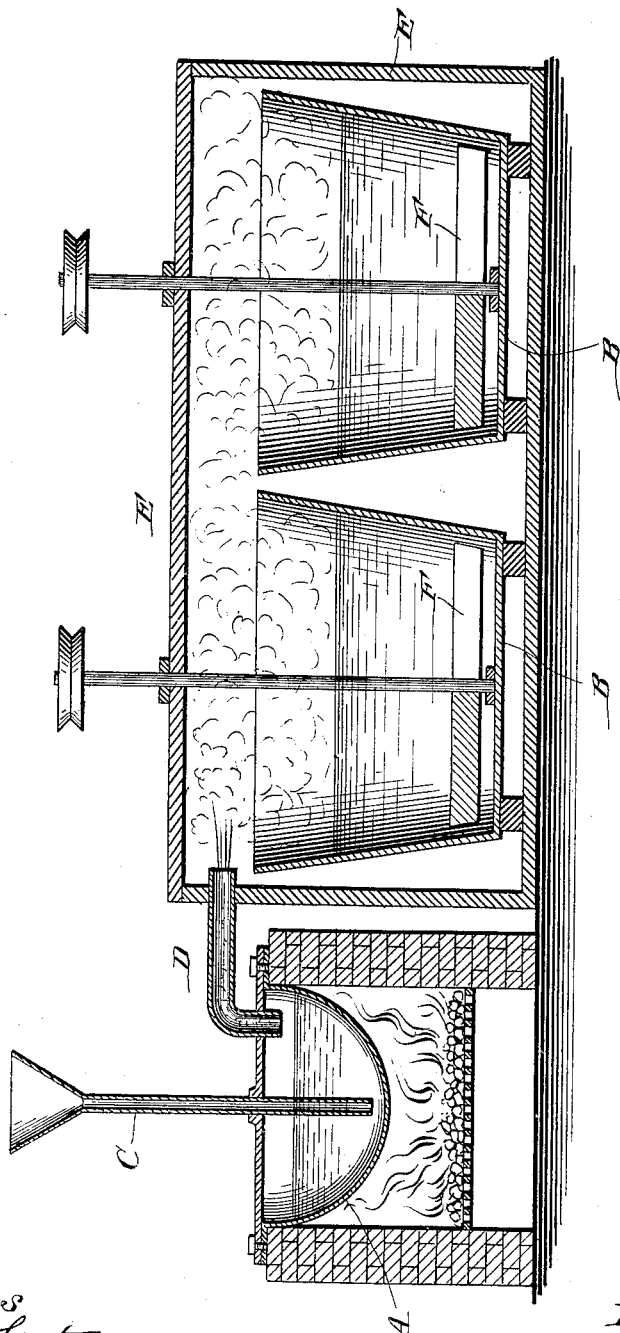
Witnesses
C. J. F. Wharton
May Wharton
Inventor:
John C. Wharton.

UNITED STATES PATENT OFFICE.

JOHN C. WHARTON, OF NASHVILLE, TENNESSEE.

PROCESS OF MAKING PHOSPHATES.

SPECIFICATION forming part of Letters Patent No. 657,717, dated September 11, 1900.

Application filed December 18, 1899. Serial No. 740,723. (No specimens.)

*To all whom it may concern:*

Be it known that I, JOHN C. WHARTON, a citizen of the United States, residing at Nashville, in the county of Davidson and State of Tennessee, have invented certain new and useful Improvements in Processes of Extracting Phosphates from Phosphate Rocks, of which the following is a specification.

Phosphate rocks as found in natural deposits are variable in the percentages of phosphate of lime and some other phosphates which they contain, and these phosphates are generally in an insoluble condition in relation to water. It is desirable to extract from low grades of phosphate rocks their contents of phosphates and also to effect a conversion of the insoluble into one or more of the soluble varieties, even when high grades of rock are used, or to manufacture superphosphates of high grades from any kind of phosphate rocks or from bones.

The mode of carrying out my invention is as follows:

The process may be divided into three operations or steps. The first step consists in dissolving the calcium phosphate existing in the rock and is described under the head of "Solution." The second step is described under "Precipitation." The third step is described under "Recovery of ammonium chloride."

*Solution:* (First step.)—In the first part of my process I place a convenient amount of ammonium chloride in a suitable vessel capable of delivering hydrochloric acid to the properly-prepared phosphate rock in a suitable container, the said rock being crushed or ground, as may be advisable for its ready solution in hydrochloric acid and water in suitable amounts. The ammonium chloride is used dry or in watery solution, as may be most convenient. As the process is designed to be continuous the relative proportions of the ammonium chloride and phosphate rock to be acted upon will vary within wide limits, as occasion may demand. To the ammonium chloride is added sulphuric acid sufficient in amount to insure the liberation of the entire amount of hydrochloric acid possible to be evolved from the given charge of ammonium chloride, the sulphuric acid at the same time combining with the ammonium to form ammonium sulphate, which is subsequently used as described in the second part of the process. The hydrochloric acid is expelled by heat and is conducted by a suitable passage-way from the generating-vessel into the mass of crushed or ground phosphate rock. Steam or hot water or cold water may be added to the rock at any convenient time to aid the solution. The hydrochloric acid attacks and dissolves the phosphates contained in the rock, and the solution thus made is either drawn off by decantation or filtered off in any practicable manner to separate it from the insoluble portion of the rock. The insoluble residue is washed with water to a practical removal of soluble matter, and the first or stronger washings are added to the solution of phosphates already obtained, while the weaker washings are used in connection with water in succeeding operations. The phosphatic solution, if so desired, is concentrated by evaporation, even to the crystallization of the superphosphate of lime, the crystallized product being removed from the solution in any practical manner when deemed proper so to do.

*Precipitation:* (Second step.)—The solution of phosphates obtained in the first step, or a portion of the said solution, is placed in a suitable vessel or vessels or pans in an inclosing chamber or room and so arranged that the phosphatic solution shall receive and absorb ammonia-gas, the absorption being aided by suitable stirrers to agitate the phosphatic solution continuously or at intervals, as may be desired. The ammonia-gas is obtained by adding a sufficient excess of either quicklime or slaked lime and water to the residue or a part of the residue of ammonium sulphate produced in the first step and is conveyed in any convenient manner into the chamber where the pans of phosphatic solution have been placed, or the mixture of ammonium sulphate, lime, and water may be placed in the said chamber. The evolution of the ammonia-gas is aided by heat, and the gas being absorbed by the phosphatic solution precipitates the calcium phosphates and other phosphates from the solution. A partial or complete precipitation of the phosphates is brought about by controlling the amount of absorbed ammonia, as may be desired. The precipitated phosphates are separated from the liquid portion or residual solution containing ammonium chloride and calcium chloride by any convenient method—as, for instance by filtration, by expression, or by a centrifugal separator. The precipitated phosphates are washed with water and dried or are dried without washing, as may be preferred. Any suitable drying device may be employed. The precipitated phosphates, if the precipitation has been complete, will have the power to precipitate an additional quantity of phosphates from the untreated phosphatic solution formed in the first step, when the precipitated phosphates and the said phosphatic solution are mixed, and this is done when so desired. This latter precipitate is secured by suitable means, as in the former instance.

*Recovery of ammonium chloride:* (Third step.)—The liquid portions or residual solutions obtained in the second step after separation of the precipitated phosphates, as described, will contain ammonium chloride and calcium chloride, and if precipitation with ammonia has been sufficiently well done the liquid will also contain ammonium hydrate. In this case the calcium chloride may be decomposed by passing carbonic-acid gas into the ammoniacal solution, whereby calcium carbonate will be precipitated and ammonium chloride will be left in the solution, or ammonium carbonate may be formed first and introduced into the solution to precipitate the calcium from the calcium chloride as calcium carbonate, if so desired. When the residual solution, which contains the calcium chloride, is not alkaline to the required degree, it can be so rendered by exposing it to the action of ammonia-gas in the chamber, as described in the second step of the process. If it be preferred, however, the calcium chloride may be decomposed by sulphuric acid or a soluble sulphate. The addition of ammonium sulphate may be preferably used in practice as a precipitant of the calcium as sulphate by its reaction with calcium chloride. The precipitated calcium salt as carbonate or sulphate is removed by any suitable means, as by decantation, filtration, or otherwise. The solution or filtrate after the removal of the calcium salt and containing ammonium chloride may be evaporated to obtain the dry ammonium chloride as the original or a part of the original ammonium chloride with which the process was begun, as described in the first step, or the solution may be used without evaporation, if preferred, and thus complete a round or cycle in which the ammonium chloride acts over and over again as a "chemical tool." Any ammonium chloride which may be lost in the process or which may by design be left in the products or by-products is replaced by a fresh supply, as at first used.

To indicate the proportion of materials to be used in some cases, the following example is given: two hundred and fifty-eight pounds of a "sixty-per-cent." phosphate rock will require for extraction about one hundred and two pounds of ninety-three-per-cent. sulphuric acid and ninety-two pounds of ordinary slaked lime, with water sufficient for dissolving and washing out the soluble phosphates.

In the accompanying drawing, A represents a retort or covered evaporator; C, a funnel-tube; D, exit-pipe; B B, tanks; F F, stirrers; E E, containing-chamber.

In the first step ammonium chloride is placed in the retort A, and sulphuric acid is passed into it through the funnel-tube C. Hydrochloric acid is thereby liberated from the mixture according to the following chemical equation:

$$2NH_4Cl + H_2SO_4 = (NH_4)_2SO_4 + 2HCl.$$

Ammonium sulphate remains in the retort A, while hydrochloric acid passes through pipe D into the chamber E E, the expulsion being aided by heat. In the chamber E E are tanks or vessels B B, containing an admixture of ground phosphate rock and water into which the evolved hydrochloric acid is absorbed and effects a solution of the phosphates contained in the rocks, the actions being aided by the stirrers F F, operated by any suitable motor. Solution of the calcium phosphate takes place according to the following equation:

$$Ca_3(PO_4)_2 + 4HCl = CaH_4(PO_4)_2 + 2CaCl_2,$$

or one molecule of tricalcium phosphate, plus four molecules of hydrochloric acid, are equal to one molecule of mono ("acid") calcium phosphate, plus two molecules of calcium chloride. The solution of monocalcium phosphate, calcium chloride, and other soluble matter is separated from the insoluble portion by any suitable means.

In the second step the tanks B B (having been cleaned from the insoluble matter left after the actions described in the first step) or a duplicate set of tanks, as may be preferred, are filled sufficiently with the clear solution of phosphates, calcium chloride, &c., obtained in the first step. Calcium hydroxide or "milk of lime" is mixed with the ammonium sulphate (or a sufficient portion of it) in the retort A and heat is applied. The ammonium sulphate and calcium hydroxide react to evolve ammonia-gas and water or ammonium hydroxide, according to the following equation:

$$(NH_4)_2SO_4 + Ca(OH)_2 = CaSO_4 + 2NH_4OH.$$

The vapor of "ammonia" is passed through the pipe D into the chamber E E and is absorbed into the solution of phosphates, calcium chloride, &c., contained in the tanks B B, the absorption being facilitated by stirring the liquid continuously or at intervals. The ammonium hydroxide and calcium salts react with each other, and one or more kinds of calcium phosphate or an admixture of calcium phosphates are precipitated, depending on the relative proportions of the reacting molecules. The following equations show the reactions:

First:

$$CaH_4(PO_4)_2 + CaCl_2 + 2NH_4OH = Ca_2H_2(PO_4)_2 + 2NH_4Cl + 2H_2O.$$

In this case the dicalcium phosphate, or "ammonium-citrate-soluble" calcium phosphate, $Ca_2H_2(PO_4)_2$, is precipitated.

Second:

$$CaH_4(PO_4)_2 + 2CaCl_2 + 4NH_4OH = Ca_3(PO_4)_2 + 4NH_4Cl + 4H_2O.$$

In this case the tricalcium phosphate, or "bone" phosphate $Ca_3(PO_4)_2$, is precipitated. As the fertilizing and market values of the tricalcium phosphate are less than that of the other two varieties popularly known as "water soluble" and "ammonia-citrate soluble," it will, as a general rule, be desirable to convert any tricalcium phosphate that may be precipitated into one of the "soluble" forms, and to this action allusion is made in the latter part of the description of actions previously made in the second step. The statement there made is: "The precipitated phosphates, if the precipitation has been complete, will have the power to precipitate an additional quantity of phosphates from the untreated phosphatic solution formed in the first step." The complete precipitation mentioned has reference to the precipitation of the tricalcium variety indicated in the second chemical equation just given, and the explanation is shown by the following equation:

$$Ca_3(PO_4)_2 + CaH_4(PO_4)_2 = 2Ca_2H_2(PO_4)_2,$$

where one molecule each of tricalcium phosphate (as a precipitate) and of monocalcium phosphate (in solution) react together to form two molecules of dicalcium phosphate, (a precipitate.) Thus the single molecule of precipitated tricalcium phosphate has the power to cause the precipitation of a single molecule of monocalcium phosphate from the phosphatic solution, as stated in the clause referred to, the product in this case being one of the so-called "available" phosphates, its chemical constitution being $Ca_2H_2(PO_4)_2$ or $2CaHPO_4$. This is separated from the liquid portion by any suitable means.

In the third step the liquid portions separated from the precipitate, as last mentioned, in the second step are placed in any convenient vessels or tanks, as B B, and if the calcium chloride is to be decomposed by carbon dioxide the liquid is rendered alkaline, if not already so, by passing ammonia into it from the retort A or its mechanical equivalent. Carbon dioxide from any convenient source (as from a limekiln in action) is passed into the alkaline solution, and the calcium element from the calcium chloride is precipitated as calcium carbonate, while the chlorine combines with the ammonium radical to form ammonium chloride according to the following equation:

$$CaCl_2 + 2NH_4OH + CO_2 = CaCO_3 + 2NH_4Cl + H_2O.$$

The calcium carbonate is separated and ammonia chloride is left in the solution. If the calcium chloride is to be decomposed by ammonium sulphate the reaction is as shown by the following equation:

$$CaCl_2 + (NH_4)_2SO_4 = CaSO_4 + 2NH_4Cl.$$

The calcium sulphate is separated and ammonium chloride is left in the solution.

No claim is made for any apparatus or product mentioned in this specification, reference to such being made only to render the procedure more intelligible.

What I claim as new, and desire to secure by Letters Patent, is—

The process for extracting phosphates from phosphate rocks, consisting in liberating hydrochloric acid from ammonium chloride by the admixture of sulphuric acid; passing the evolved hydrochloric acid into a mixture of phosphate rocks and water, effecting solution of the phosphates; separating the phosphatic solution from the undissolved matter; precipitating the phosphates from the said phosphatic solution; separating the precipitated phosphates from the liquid portion containing calcium chloride and ammonium chloride; precipitating the calcium from the calcium chloride, separating the precipitate from the ammonium chloride; adding other ammonium chloride to supply any deficiency and using the ammonium chloride as at first, and consecutively, substantially as described and set forth.

In testimony whereof I have signed my name to this specification in the presence of two subscribing witnesses.

JOHN C. WHARTON.

Witnesses:
C. J. F. WHARTON,
MAY WHARTON.